(12) United States Patent
Folken et al.

(10) Patent No.: US 8,942,942 B2
(45) Date of Patent: Jan. 27, 2015

(54) GENERATOR SET CALIBRATION CONTROLLER

(75) Inventors: Keith Ronald Folken, West Peoria, IL (US); Michael Allen Dvorsky, Peoria, IL (US); Matthew Joseph Meinhart, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 783 days.

(21) Appl. No.: 13/150,451

(22) Filed: Jun. 1, 2011

(65) Prior Publication Data
US 2012/0310580 A1 Dec. 6, 2012

Related U.S. Application Data (60) Provisional application No. 61/572,275, filed on Jul. 23, 2010.

(51) Int. Cl.
H02P 9/02 (2006.01)
G01R 21/06 (2006.01)
H02P 9/00 (2006.01)

(52) U.S. Cl.
CPC .. H02P 9/02 (2013.01); H02P 9/006 (2013.01)
USPC ............................................. 702/104; 702/60

(58) Field of Classification Search
CPC ........................................................ G01R 1/00
USPC ........................................ 702/57, 61, 64, 79
See application file for complete search history.

(56) References Cited

U.S. PATENT DOCUMENTS

| | | | |
|---|---|---|---|
| 5,514,958 A | 5/1996 | Germer | |
| 5,592,393 A | 1/1997 | Yalla | |
| 5,880,415 A | 3/1999 | Colby et al. | |
| 6,262,672 B1 | 7/2001 | Brooksby et al. | |
| 6,282,104 B1 | 8/2001 | Kern | |
| 6,636,028 B2 | 10/2003 | Lavoie et al. | |
| 6,735,535 B1 | 5/2004 | Kagan et al. | |
| 6,892,144 B2 * | 5/2005 | Slater et al. | 702/61 |
| 6,911,813 B2 | 6/2005 | Gandhi | |
| 6,975,951 B1 | 12/2005 | Sutrave et al. | |

(Continued)

FOREIGN PATENT DOCUMENTS

| | | |
|---|---|---|
| JP | 11-511947 A | 10/1999 |
| JP | 11511947 | 10/1999 |

(Continued)

OTHER PUBLICATIONS

International Search Report and Written Opinion mailed Feb. 10, 2012, for corresponding PCT International Application No. PCT/US2011/044653, 10 pages.

*Primary Examiner* — Sujoy Kundu
*Assistant Examiner* — Ricky Ngon
(74) *Attorney, Agent, or Firm* — Finnegan, Henderson, Farabow, Garrett & Dunner LLP (57) ABSTRACT

A controller for a generator set is disclosed. The controller may have a memory module having stored therein calibration factors associated with an offset error, a scale error, and a time delay error, and a processor module in communication with the memory module. The processor module may be configured to monitor at least one parameter of electric power directed from the generator set to a load, detect connection of the generator set to the load, and determine adjustments to the calibration factors after connection of the generator set to the load based on a comparison of the at least one parameter monitored by the processor module and measured at the load.

20 Claims, 3 Drawing Sheets

(56) References Cited

U.S. PATENT DOCUMENTS

| | | |
|---|---|---|
| 6,988,043 B1 * | 1/2006 | Randall .......................... 702/61 |
| 7,102,556 B2 | 9/2006 | White |
| 7,359,809 B2 | 4/2008 | Bruno |
| 7,521,822 B2 | 4/2009 | Lorenz |
| 7,660,682 B2 | 2/2010 | Slota et al. |
| 2008/0125986 A1 * | 5/2008 | Slota et al. ...................... 702/61 |
| 2009/0296439 A1 | 12/2009 | Qi et al. |
| 2011/0198928 A1 | 8/2011 | Lee |
| 2012/0025807 A1 * | 2/2012 | Banhegyesi ............... 324/76.11 |

FOREIGN PATENT DOCUMENTS

| | | |
|---|---|---|
| JP | 2001-186667 A | 7/2001 |
| JP | 2001186667 | 7/2001 |
| JP | 4189071 | 12/2008 |
| KR | 10-0768040 B1 | 10/2007 |
| KR | 100768040 | 10/2007 |
| KR | 10-2010-0041688 A | 4/2010 |
| KR | 1020100041688 | 4/2010 |
| WO | WO 96/23350 A1 | 8/1996 |

\* cited by examiner

GENERATOR SET CALIBRATION CONTROLLER

RELATED APPLICATIONS

This application claims the benefit of U.S. Provisional Application No. 61/572,275, filed Jul. 23, 2010, which is incorporated herein by reference.

TECHNICAL FIELD

The present disclosure relates generally to a calibration controller, and more particularly, to a calibration controller for a generator set.

BACKGROUND

Generator sets (gensets) are self-contained power modules that can be permanently or temporarily connected to an off-board facility, for example to a home, a hospital, or a factory, to provide primary, supplemental, and emergency backup power to one or more external loads. Cables extend from a distribution grid of the facility to the gensets and are selectively connected to the gensets by way of load interruption devices. A genset controller, typically mounted on each genset, monitors and responsively controls characteristics of electric power produced by each genset and sent to the off-board facility.

In some situations, the voltage and/or current produced by a genset may be too high for the genset controller to directly measure. In these situations, one or more current and/or voltage transformers may be used to step down the voltage and current to lower levels, which may be more readily accepted by the controller. In order for each genset to provide power having characteristics desired by a customer, each genset controller should accurately measure the stepped down and converted power and properly correlate this power to the power produced by the associated genset. Unfortunately, the different sensing components and circuitry within the controller, as well as the different transformers that provide the stepped-down power to the controller, can introduce shift, scale, and delay errors into the measurements made by the controller. Accordingly, the controller may require calibration for optimum performance.

Historically, calibration of a genset controller has been performed manually. That is, power from a genset was directed through a metering device simultaneous with readouts from a corresponding genset controller. If scale or time delay errors between the measured genset power and the controller readouts were observed on the metering device, a technician could then adjust settings of the genset controller such that the errors were reduced. Although satisfactory for some applications, this manual calibration process was time consuming and had an accuracy level too low for other applications.

A method of calibrating a power meter device is disclosed in U.S. Pat. No. 7,660,682 (the '682 patent) of Slota et al. published on Feb. 9, 2010. Specifically, the '682 patent discloses a metering device having transformers for stepping down and converting from AC to DC electrical energy in a power line, circuitry for measuring a parameter of the transformed electrical energy, a storage device for storing a calibration factor, and a processor for processing the calibration factor and adjusting the measuring of the parameter to compensate for scale and time delay errors caused by the transformers and the circuitry. In a first mode of operation, which occurs at a factory, errors generated by the circuitry are determined and calibration factors are calculated that will be used during a second mode of operation to compensate for the circuitry-generated errors. During a third mode of operation, which occurs after the circuitry is connected to the transformers at a substation, the processor applies different known voltages and/or currents to the transformers at a number of different test points and measures outputs of the circuitry. The measured outputs are compared to expected outputs and corresponding error values are determined. The processor then determines adjustments for compensating for the errors at the test points. The storage device stores the calibration factors and the adjustments, and the circuitry references and implements the stored information during parameter measuring in the second mode of operation.

Although the method of the '682 patent may be helpful when calibrating a power meter, the benefit thereof may be minimal. In particular, the method may still rely on a manual calibration process completed at a factory, which, as described above, can be time consuming and have low accuracy. In addition, the test points utilized by the processor at the substation may not be selected to provide a sufficiently accurate determination of error. Further, the method of the '682 patent makes a comparison with expected values during the third mode of operation, which can be problematic if the expected values do not properly match actual values. Finally, the method of the '682 patent may not be applicable to a genset controller.

The disclosed calibration controller is directed to overcoming one or more of the problems set forth above and/or other problems of the prior art.

SUMMARY

In one aspect, the present disclosure is directed to a controller for a generator set. The controller may include a memory module having stored therein calibration factors associated with an offset error, a scale error, and a time delay error, and a processor in communication with the memory module. The processor module may be configured to monitor at least one parameter of electric power directed from the generator set to a load, and detect connection of the generator set with the load. The processor module may also be configured to determine adjustments to the calibration factors after connection of the generator set with the load based on a comparison of the at least one parameter monitored by the processor module and measured at the load.

In another aspect, the present disclosure is directed to a generator set. The generator set may include a frame, an internal combustion engine mounted to the frame, and a generator mounted to the frame and driven by the internal combustion engine to generate electric power. The generator set may also include a transformer configured to generate at least one signal indicative of a parameter of the electric power, and a controller mounted to at least one of the frame and the generator. The controller may include a memory module having stored therein calibration factors associated with an offset error, a scale error, and a time delay error of the at least one signal, and a processor module in communication with the memory module. The processor module may be configured to monitor the at least one parameter, detect connection of the generator set with a load, and determine adjustments to the calibration factors after connection of the generator set with the load based on a comparison of the at least one parameter monitored by the processor module and measured at the load.

In yet another aspect of the present disclosure is directed to a calibration system. The calibration system may include a transformer configured to generate at least one signal indicative of a parameter of electric power, a processor, and a controller in communication with the processor. The processor may be configured to perform a first calibration prior to connection of the electric power with a load to adjust for an offset error, a scale error, and a time delay error of the at least one signal. The controller may be configured to monitor the at least one signal, regulate operation of a source of the electric power in response to the at least one signal, and perform a second calibration after connection of the electric power with the load to adjust for the scale error and the time delay error of the at least one signal.

In still another aspect, the present disclosure is directed to a power system. The power system may include a load, a generator configured to generate electric power directed to the load, a connector disposed between the generator and the load, and a transformer configured to generate at least one signal indicative of a parameter of the electric power. The power system may also include a processor configured to perform a first calibration prior to closure of the connector to adjust for an offset error, a scale error, and a time delay error of the at least one signal. The power system may further include a controller in communication with the processor. The controller may be configured to monitor the at least one signal, regulate operation of the generator in response to the at least one signal, and perform a second calibration after closure of the connector to adjust for the scale error and the time delay error of the at least one signal, wherein closure of the connector triggers the second calibration.

In another aspect, the present disclosure is directed to a method of calibrating a power system. The method may include generating electric power having an alternating current, transforming the electric power to a lower voltage alternating current signal, monitoring the lower voltage alternating current signal, and regulating generation of electric power based on a parameter of the lower voltage alternating current signal. The method may further include performing a first calibration prior to connection of the electric power with a load to adjust for an offset error, a scale error, and a time delay error associated with the direct current, and performing a second calibration after connection of the electrical power with the load to adjust for the scale error and the time delay error associated with the lower voltage alternating current signal.

DETAILED DESCRIPTION

Figure 1:
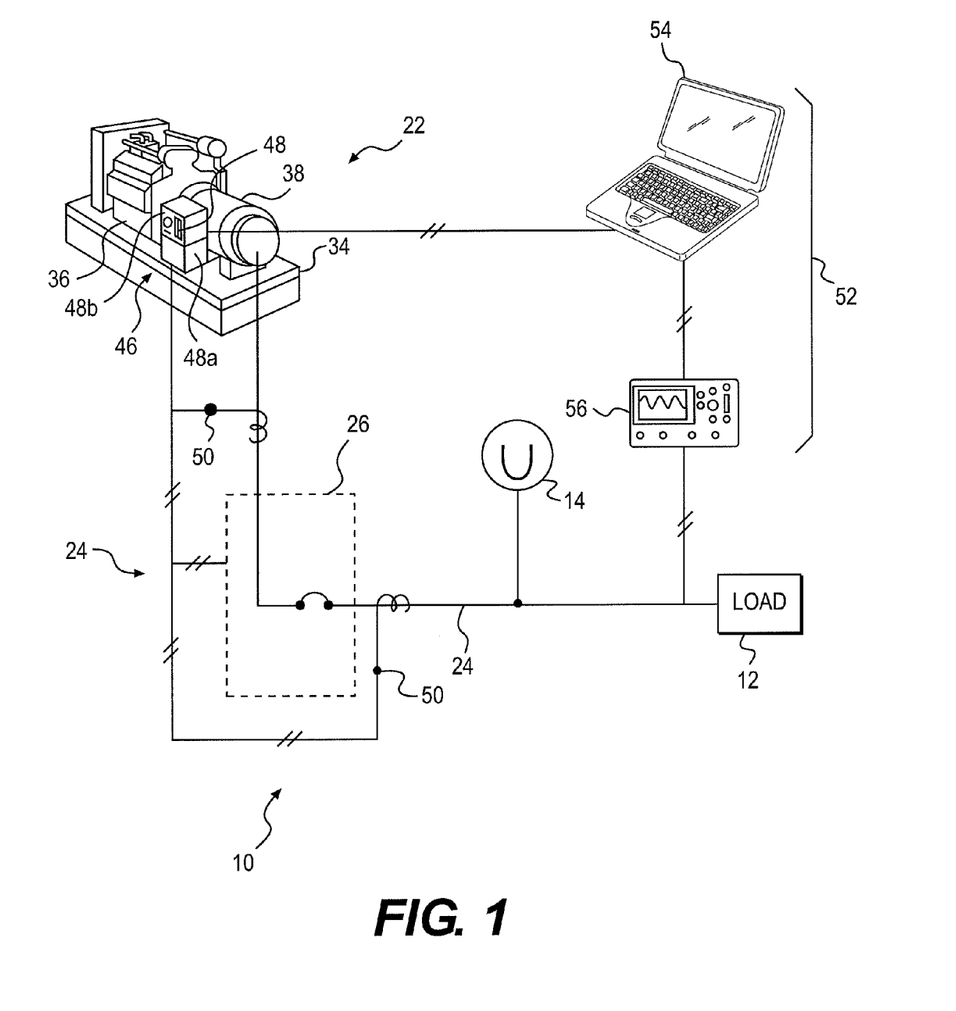
FIG. 1 is a diagrammatic illustration of an exemplary disclosed power system.

FIG. 1 illustrates an exemplary power system 10 consistent with certain disclosed embodiments. Power system 10 may include a generator set (genset) 22 and a load 12. In one exemplary embodiment, genset 22 may provide emergency backup power to load 12 when power supplied from a utility power grid 14 is interrupted. In another embodiment, genset 22 may be configured to provide primary power or temporary supplemental power, if desired. As shown in FIG. 1, genset 22 and utility power grid 14 may be connected to load 12 by way of a power transmission network 24. A connector 26 may be disposed within power transmission network 24 between genset 22 and load 12 at a location upstream of utility power grid 14 (i.e., at a location that allows genset 22 to be connected to and disconnected from load 12 without affecting a connection between utility power grid 14 and load 12).

Load 12 may include any type of power consuming system or device that is located external to and offboard of genset 22. Load 12 may receive electric power supplied by utility power grid 14 and genset 22, and utilize the electric power to perform specialized tasks. Load 12 may include, for example, lights, motors, heating elements, electronic circuitry, refrigeration devices, air conditioning units, computer servers, industrial machines, etc.

Transmission network 24 may embody any electric transmission system for distributing electric power generated by utility power grid 14 and genset 22 to load 12. For example, transmission network 24 may include a system of transmission lines, connection equipment (e.g., switch gears, transformers, power relays, and the like), and other suitable devices for distributing electric power across a grid. In one embodiment, portions of transmission network 24 may be buried underground and/or run overhead via transmission towers.

Connector 26 may include any type of device capable of coupling together genset 22, transmission network 24, and load 12. For example, connector 26 may include various transfer switches, junction boxes, breakers, fuses, load-interruption devices, or any other components that may be suitable for electrically interconnecting one or more devices and systems. Connector 26 may be manually or automatically operated to close and thereby transmit electric power or to open and thereby inhibit the transmission of electric power.

Genset 22 may be a mobile, frame-mounted unit that includes components that interact to generate electric power. Accordingly, genset 22 may comprise a frame 34, a prime mover 36 mounted to frame 34, and a generator 38 mounted to frame 34 and mechanically coupled to rotate with an output of prime mover 36. For the purposes of this disclosure, prime mover 36 is depicted and described as a heat engine, for example, a combustion engine that combusts a mixture of fuel and air to produce the rotating mechanical output. One skilled in the art will recognize that prime mover 36 may be any type of combustion engine such as a diesel engine, a gasoline engine, or a gaseous fuel-powered engine. Generator 38 may be, for example, an AC induction generator, a permanent-magnet generator, an AC synchronous generator, or a switched-reluctance generator. In one embodiment, generator 38 may include multiple pairings of poles (not shown), each pairing having three phases arranged on a circumference of a stator (not shown) to produce an alternating current with a frequency of 50 or 60 Hz. Electric power produced by generator 38 may be directed offboard genset 22 to load 12 by way of transmission network 24 and connector 26.

Genset 22 may also include a terminal box 46 mounted to frame 34 and housing a controller 48 that is in communication with prime mover 36, generator 38, and connector 26. Controller 48 may include, among other things, a memory module 48a and a processor module 48b. Processor module 48b may embody a single or multiple microprocessors, field programmable gate arrays (FPGAs), digital signal processors (DSPs), etc., that are capable of controlling operations of prime mover 36, generator 38, connector 26, and/or load 12 in response to various input. Numerous commercially available microprocessors can be configured to perform the functions of processor module 48b. It should be appreciated that processor module 48b could readily embody a microprocessor separate from those that control functions of load 12, and that processor module 48b may communicate with load microprocessors via datalinks or other methods. Various other known circuits may be associated with controller 48, including power supply circuitry, signal-conditioning circuitry, actuator driver circuitry (i.e., circuitry powering solenoids, motors, or piezo actuators), communication circuitry, and other appropriate circuitry.

According to one embodiment, controller 48 may be configured to monitor performance of power system 10 and responsively regulate operations of load 12, genset 22, transmission network 24, and/or connector 26. For example, controller 48 may monitor a current, a frequency, and/or a voltage parameter of the electric power provided by genset 22 through connector 26 to offboard load 12. In response to a value of the monitored parameter deviating from a desired value, controller 48 may generate corresponding control signals directed to load 12, connector 26, prime mover 36, and/or genset 38 that function to adjust the quality and/or the demand of the electric power. In an exemplary embodiment, one or more sensors 50 may step down the voltage and/or current of electric power from genset 22 to alternating current signals that are more acceptable for monitoring by controller 48.

Figure 2:
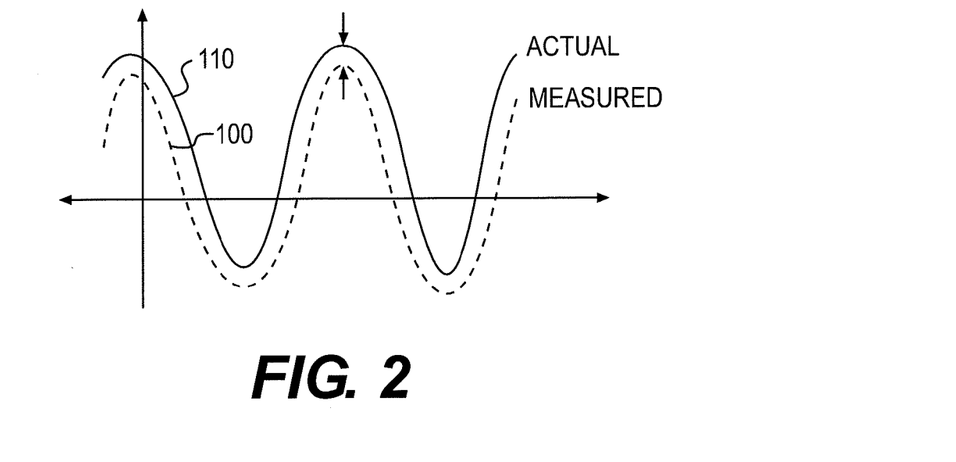
FIGS. 2-4 are graphs illustrating different possible power monitoring errors associated with the power system of FIG. 1.
Figure 3:
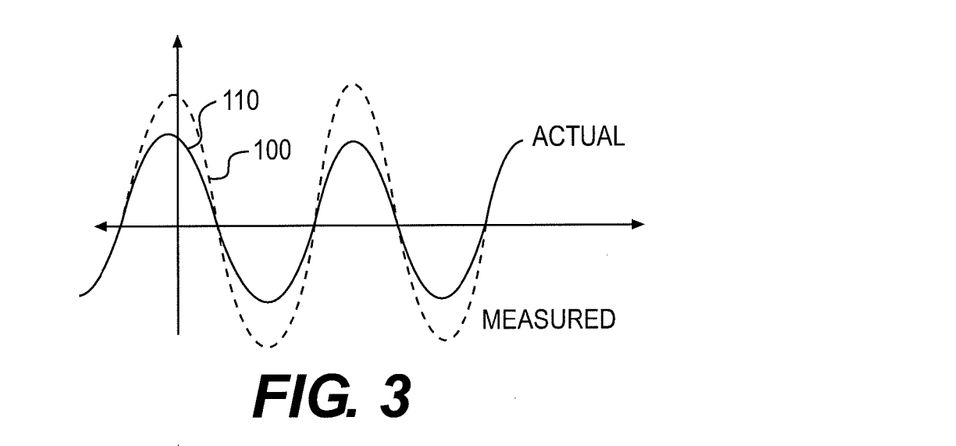
Figure 4:
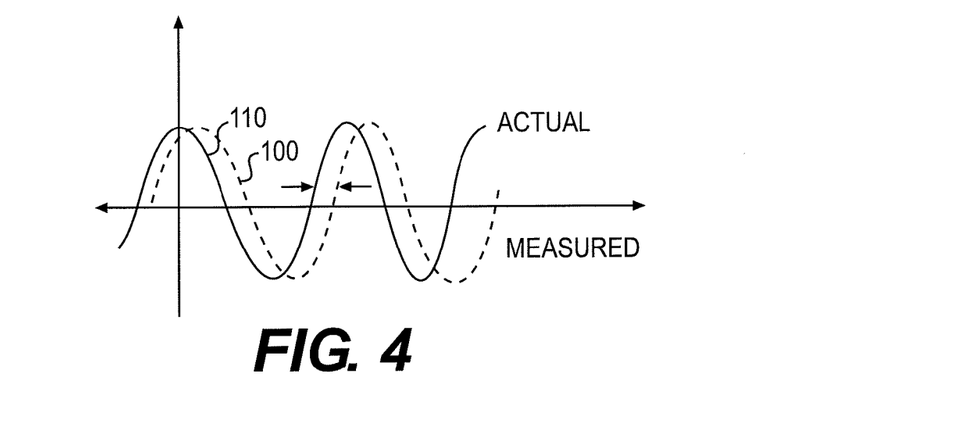

During the power transforming by sensors 50 and the monitoring of current, frequency, and/or voltage parameters by controller 48, it may be possible for errors to occur. As shown in FIGS. 2-4, these errors can include an offset error (FIG. 2), a scale error (FIG. 3), and a time delay error (FIG. 4), and be caused or influenced by hardware and/or software inefficiencies associated with any components of power system 10. The offset error may occur either when sensors 50 generate a signal indicative of a measured value (represented by a curve 100) that is consistently lower or higher than an actual value (represented by a curve 110) of the parameter being monitored, or when controller 48 incorrectly interprets the signal from sensors 50 to correspond with a consistently lower or higher value. The scale error may occur either when sensors 50 generate a signal indicative of a measured value that deviates from an actual value of the parameter by a scaled amount, or when controller 48 incorrectly interprets the signal by a scaled amount. The time delay error may occur throughout generation and/or interpretation of the signal due to inherent time lags built into the hardware and software of the power system components. The offset, scale, and time delay errors can be represented by a space between curves 100 and 110 in FIGS. 2, 3, and 4, respectively.

Power system 10 may include a calibration system 52 associated with genset 22 and load 12 that accounts for the offset, scale, and time delay errors described above. Calibration system 52 may include controller 48, sensors 50, an external processor 54, and a calibration reference meter 56. Processor 54 may embody, for example, a computer console that is hard wired to controller 48 and/or meter 56, a portable device such as a laptop computer or PDA that is selectively connected to controller 48 and/or meter 56, or a remote device that is wirelessly connected to controller 48 and/or meter 56. Meter 56 may embody, for example, a high-accuracy power meter used during calibration of controller 48 to precisely measure the current, voltage, and/or frequency of electric power and communicate signals indicative of the measured parameters to processor 54.

Processor 54 may be configured to perform a first calibration process (labeled as 200 in FIG. 5) that generates calibration factors associated with the offset error, the scale error and the time delay error. In one embodiment, the first calibration process may be performed at a factory that produces controller 48 and may be associated with calibration of controller 48 before controller 48 is connected to genset 22 and/or sensors 50, or at least before connection of genset 22 to load 12 (i.e., before closure of connector 26). The calibration factors determined during the first calibration process may be stored within memory module 48*a* and utilized by processor module 48*b* during power monitoring and/or regulation of power system 10.

Controller 48 may be configured to perform a second calibration process (labeled as 300 in FIG. 5) after synchronization of genset 22 with utility power grid 14 and connection of genset 22 to load 12 (i.e., after closer of connector 26). In one embodiment, closure of connector 26 may trigger the second calibration process. The second calibration process may be used to adjust the calibration factors determined during the first calibration process and thereby account for additional errors caused by sensors 50.

Figure 5:
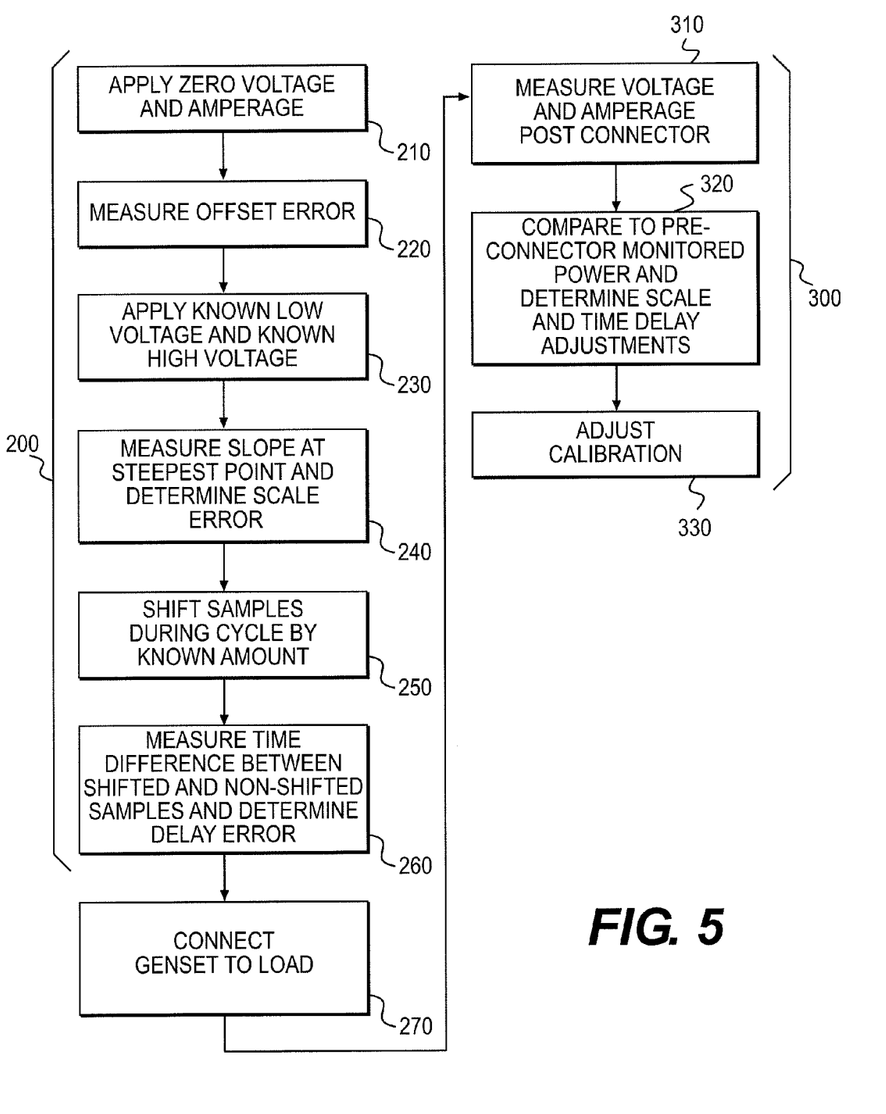
FIG. 5 is a flowchart illustrating an exemplary disclosed method of operating the power system of FIG. 1.

FIG. 5 illustrates steps of the first and second calibration processes. FIG. 5 will be discussed in more detail in the following section to further illustrate the disclosed concepts.

INDUSTRIAL APPLICABILITY

The disclosed calibration controller and system may help to improve accuracy in metering of voltage and current provided by a genset to an offboard load. In particular, the disclosed calibration controller may undergo and implement different calibration processes before and after synchronization of the genset with a utility power grid and connection of the genset to the load to adjust for errors in controller monitoring. By reducing errors in monitoring, a greater precision in genset control may be achieved. FIG. 5 will be now be discussed in detail.

As described above, the first calibration process 200 may be implemented before synchronization of genset 22 with utility power grid 14 and connection of genset 22 to load 12. In one embodiment, processor 54 may implement the first calibration process 200 before controller 48 is even connected to genset 22, for example, at a factory that produces controller 48.

During the first calibration process 200, processor 54 may direct an alternating 3-phase test voltage having a desired voltage and a desired amperage to controller 48 (Step 210). In one embodiment, the desired voltage and the desired amperage may be about zero, although other values are considered. At this point in time, any output of controller 48 indicative of corresponding parameter values that deviate from the desired voltage and amperage may be related to the offset error. For example, during monitoring of power having zero current and zero amperage, any non-zero output of controller 48 may be equated to the offset error. Accordingly, processor 54 may utilize meter 56 to measure the output of controller 48, and directly relate the measured output to the offset error (Step 220). In one embodiment, the output of controller 48 corresponding with each phase of the test voltage may be independently measured and averaged, and the average output then related to the offset error. A first calibration factor corresponding to the offset error may then be stored within memory module 48*a* for subsequent monitoring/interpreting use by processor module 48*b*.

After determining the offset error and implementing the corresponding first calibration factor, processor 54 may direct an alternating 3-phase test voltage having a known high voltage level, a known low voltage level, a known high current level, and a known low current level to controller 48 (Step 230). In one embodiment, the known high voltage level may be about 277 volts, the known low voltage level may be about 0 volts, the known high current level may be about 4.5 A, and the known low current level may be about 0 A. At this point in time, controller 48 may output a sinusoidal signal for each phase of power indicative of the monitored power alternating between the high and low voltage and current levels. Processor 54 may utilize meter 56 to measure each signal at two spaced apart points on the sinusoidal signal at locations about midway between the high and low levels (i.e., at locations where a slope of the sinusoidal curves are the greatest), determine a slope between the two points, and then directly relate the slope of each signal to the scale error (Step 240). By sampling the signals at the locations of greatest slope, an accuracy of the measurement may be improved, as the values of the signals may be changing the most at this time and any error in scale may be readily apparent. If the samples were instead taken at locations of no slope (e.g., when the signals are at the high or low levels) or at locations of lesser slope, the signals may not be changing much at all and provide less of an indication of scale error. A second calibration factor corresponding to the scale error may then be stored within memory module 48a for subsequent monitoring/interpreting use by processor module 48b.

After determining the scale error and implementing the corresponding second calibration factor, processor 54 may be configured to utilize samples taken during the scale error determination to calculate the time delay error and a corresponding third calibration factor. In particular, while processor 54 is determining the scale error, samples of the output signals from controller 48 corresponding with each of the three phases of power may be taken and temporarily stored within a memory of processor 54. Processor 54 may be configured to then adjust the sample rate of controller 48 and selectively shift the buffer of waveforms by a known time delay for less than all of the samples (Step 250). In one embodiment, all but one sinusoidal signal may be shifted by the known time delay. Processor 54 may then be configured to compare the values of the delayed signals with the value of the non-delayed signal and, based on this comparison, calculate a time delay error associated with the hardware of controller 48 and the corresponding third calibration factor utilizing one or more predetermined algorithms stored within memory module 48a (Step 260). The third calibration factor may be stored within memory module 48a for subsequent monitoring/interpreting use by processor module 48b.

After determining the three calibration factors corresponding to the offset error, the scale error, and the time delay error, controller 48, now programmed with the factors, may be connected to genset 22. Alternatively, if the first calibration was completed with controller 48 already onboard genset 22, the output of genset 22 may synchronize with utility power grid 14 and connector 26 may close to connect electric power from genset 22 with load 12 after completion of the first calibration process. Closure of connector 26 may be completed manually, or automatically by controller 48 or processor 54, if desired.

Controller 48 may initiate the second calibration process once the electric power of genset 22 has been synchronized with utility power grid 14 and connected to load 12. As described above, closure of connector 26, in one embodiment, may trigger initiation of the second calibration process. During the second calibration process, controller 48 may monitor parameter values of electric power from genset 22 (i.e., at a location upstream of connector 26) and at load 12 (i.e., at a location downstream of connector 26) by way of both sensors 50 (Step 310). Controller 48 may then compare the signals from the upstream sensors 50 with the signals from the downstream sensor 50 and, based on the comparison, determine adjustments to the scale and time delay calibration factors stored in memory module 48a (Step 320). These adjustments may account for influences external to controller 48, for example, influences of sensors 50, transmission network 24, connector 26, load 12, etc. Controller 48 may adjust the calibration factors accordingly, and store the adjusted calibration factors in memory module 48a for subsequent monitoring/interpreting use by processor module 48b (Step 330).

Several advantages may be associated with the disclosed calibration system. In particular, because the disclosed calibration system may perform both the first and second calibration processes automatically, little operator time may be required. In addition, the sample points utilized during the first and second calibration processes may be selected to improve error detection. Further, because the first and second calibration process may compare monitored values with actual values measured by a high-accuracy meter, the resulting calibration factors may function to greatly improve power monitoring and regulation.

It will be apparent to those skilled in the art that various modifications and variations can be made to the disclosed calibration system. Other embodiments will be apparent to those skilled in the art from consideration of the specification and practice of the calibration system disclosed herein. It is intended that the specification and examples be considered as exemplary only, with a true scope of the disclosure being indicated by the following claims and their equivalents.

What is claimed is:

1. A controller for a generator set, comprising:
  a memory module having stored therein calibration factors associated with an offset error, a scale error, and a time delay error; and
  a processor module in communication with the memory module and configured to:
    perform a fiat calibration;
    monitor at least one parameter of electric power directed from the generator set to a load;
    detect connection of the generator set with the load;
    determine adjustments to the calibration factors after connection of the generator set with the load based on a comparison of the at least one parameter monitored by the processor module and measured at the load;
    direct test voltage to a transformer during the first calibration, the transformer configured to generate a parameter of electric power;
    sample the corresponding at least one signal a plurality of equally-distributed delayed time and at least one non-delayed time during a single cycle of the test voltage; and
    relate a difference between the corresponding at least one signal sampled at the plurality of equally distributed delayed times and at the at least one non-delayed time to the time delay error.

2. The controller of claim 1, wherein the processor module is configured to automatically determine the adjustments in response to detection of generator set connection with the load.

3. The controller of claim 1, wherein the processor module is configured to affect future monitoring based on the calibration factors and the adjustments.

4. A generator set, comprising:
  a frame;
  an internal combustion engine mounted to the frame;
  a generator mounted to the frame and driven by the internal combustion engine to generate electric power;
  a transformer configured to generate at least one signal indicative of at least one parameter of the electric power; and a controller mounted to at least one of the frame and the
generator and including:
a memory module having stored therein calibration factors associated with an offset error, a scale error, and a time delay error of the at least one signal; and
a processor module in communication with the memory module and configured to:
perform a first calibration;
monitor the at least one parameter;
detect connection of the generator set with a load;
automatically determine adjustments to the calibration factors in response to detection of generator set connection with the load based on a comparison of the at least one parameter monitored by the processor module and measured at the load;
affect future monitoring based on the calibration factors and the adjustments;
direct a test voltage to the transformer during the first calibration;
sample the corresponding at least one signal a plurality of equally-distributed delayed times and at least one non-delayed time during a single cycle or the test voltage; and
relate a difference between the corresponding at least one signal sampled at the plurality of equally distributed delayed times and at the at least one non-delayed time to the time delay error.

5. A calibration system, comprising:
a transformer configured to generate at least one signal indicative of a parameter of electric power;
a processor configured to perform a first calibration prior to connection of the electric power with a load to adjust for an offset error, a scale error, and a time delay error of the at least one signal; and
a controller in communication with the processor and the transformer and configured to:
monitor the at least one signal;
regulate operation of a source of the electric power in response to the at least one signal; and
perform a second calibration after connection of the electric power with the load to adjust for a scale error and a time delay error of the at least one signal;
wherein the processor is configured to:
direct a test voltage having a known low voltage level and a known high voltage level to the transformer during the first calibration; and
relate the at least one signal corresponding to the test voltage to the scale error; and
wherein, the test voltage is sinusoidal and the corresponding at least one signal is sampled at points about midway between the known low voltage level and the known high voltage level where a slope of the test voltage is greatest, the processor being configured to relate a slope of the corresponding at least one signal at the points to the scale error.

6. The calibration system of claim 5, wherein the processor is configured to directly relate a value of the at least one signal to the offset error during the first calibration when the electric power has desired values.

7. The calibration system of claim 6, wherein the desired values include a zero voltage value and a zero amperage value.

8. The calibration system of claim 6, wherein the electric power is three phase power, and the processor is configured to calculate the offset error for each of the three phases of electric power during the first calibration.

9. The calibration system of claim 5, wherein:
the known low voltage level is about 0 volts; and the known high voltage level is about 277 volts.

10. The calibration system of claim 5, further including a meter configured to measure the electric power at the load, wherein the controller is configured to relate differences between an output of the meter and the at least one signal to the scale and time delay errors during the second calibration.

11. The calibration system of claim 5, wherein connection of the electric power to the load triggers the second calibration.

12. A power system, comprising:
a load;
a generator set configured to generate electric power directed to the load;
a connector disposed between the generator set and the load;
a transformer configured to generate at least one signal indicative of a parameter of the electric power;
a processor configured to perform a first calibration prior to closure of the connector to adjust for an offset error, a scale error, and a time delay error of the at least one signal; and
a controller in communication with the processor and configured to:
monitor the at least one signal;
regulate operation of the generator in response to the at least one signal; and
perform a second calibration after closure of the connector to adjust for the scale error and the time delay error of the at least one signal,
wherein closure of the connector triggers the second calibration; and
wherein the processor is configured to:
direct a test voltage to the transformer during the first calibration;
sample the corresponding at least one signal a plurality of equally-distributed delayed times and at least one non-delayed time during a single cycle of the test voltage; and
relate a difference between the corresponding at least one signal sampled at the plurality of equally distributed delayed times and at the at least one non-delayed time to the time delay error.

13. A method of calibrating a power system, comprising:
generating, via a generator, electric power having an alternating current;
transforming, via a transformer the electric power to a lower voltage alternating current signal;
monitoring, via a controller, the lower voltage alternating current signal;
regulating, via the controller, the generating of electric power based on a parameter of the lower voltage alternating current signal;
performing via a processor of the controller a first calibration prior to connection of the electric power with a load to adjust for an offset error, a scale error, and a time delay error associated with the lower voltage alternating current signal; and
performing, via the controller, a second calibration after connection of the electrical power with the load to adjust for the scale error and the time delay error associated with the lower voltage alternating current signal;
wherein performing the first calibration includes:
generating, via the processor, a test voltage having a known low voltage level and a known high voltage level; and relating, via the processor, the parameter corresponding with the test voltage to the scale error; and wherein the test voltage is sinusoidal and the first calibration includes sampling the test voltage at points about midway between the known low voltage level and the known high voltage level where a slope of the test voltage is greatest, the scale error being related to the parameter at the sampled points.

14. The method of claim 13, wherein performing the first calibration includes measuring, via the processor, the offset error when the electric power has desired values.

15. The method of claim 14, wherein the desired values include a zero voltage value and a zero amperage value.

16. The method of claim 14, wherein the alternating current is three phase power, and the method includes calculating, via the processor, the offset error for each of the three phases of electric power during the first calibration.

17. The method of claim 13, wherein:
the known low voltage level is about 0 volts, and
the known high voltage level is about 277 volts.

18. The method of claim 13, wherein:
the second calibration includes producing, via the controller, a measurement of the electric power at the load, and relating differences between the parameter and the measurement to the scale error and the time delay error; and
connection of the electric power to the load triggers the second calibration.

19. A calibration system, comprising:
a transformer configured to generate at least one signal indicative of a parameter of electric power;
a processor configured to perform a first calibration prior to connection of the electric power with a load to adjust for an offset error, a scale error, and a time delay error of the at least one signal; and
a controller in communication with the processor and the transformer and configured to:
monitor the at least one signal; regulate operation of a source of the electric power in response to the at least one signal; and
perform a second calibration after connection of the electric power with the load to adjust for a scale error and a time delay error of the at least one signal;

wherein the processor is further configured to:
direct a test voltage to the transformer during the first calibration;
sample the corresponding at least one signal a plurality of equally-distributed delayed times and at least one non-delayed time during a single cycle of the test voltage; and
relate a difference between the corresponding at least one signal sampled at the plurality of equally distributed delayed times and at the at least one non-delayed time to the time delay error.

20. A method of calibrating a power system, comprising:
generating, via a generator, electric power having an alternating current;
transforming, via a transformer, the electric power to a lower voltage alternating current signal;
monitoring, via a controller, the lower voltage alternating current signal;
regulating, via the controller, the generating of electric power based on a parameter of the lower voltage alternating current signal;
performing, via a processor of the controller, a first calibration prior to connection of the electric power with a load to adjust for an offset error, a scale error, and a time delay error associated with the lower voltage alternating current signal; and
performing, via the controller, a second calibration after connection of the electrical power with the load to adjust for the scale error and the time delay error associated with the lower voltage alternating current signal;
wherein the first calibration includes:
generating, via the processor, a test voltage;
sampling, via the processor, the parameter corresponding to the test voltage a plurality of equally-distributed delayed times and at least one non-delayed time during a single cycle of the test voltage; and
relating, via the processor, a difference between the parameter sampled at the plurality of equally distributed delayed times and the at least one non-delayed time to the time delay error.

* * * * *